United States Patent [19]

Davis

[11] E Patent Number: Re. 32,092

[45] Reissued Date of Patent: Mar. 18, 1986

[54] LIQUID MODULATOR

[75] Inventor: William G. Davis, Houston, Tex.

[73] Assignee: Liquid Modulators, Inc., Houston, Tex.

[21] Appl. No.: 635,000

[22] Filed: Jul. 27, 1984

Related U.S. Patent Documents

Reissue of:

[64] Patent No.: 4,341,092
Issued: Jul. 27, 1982
Appl. No.: 208,542
Filed: Nov. 20, 1980

[51] Int. Cl.[4] ..... F25B 43/04

[52] U.S. Cl. ..... 62/475; 62/509; 62/513

[58] Field of Search ..... 62/503, 509, 513, 475

[56] References Cited

U.S. PATENT DOCUMENTS

| | | | |
|---|---|---|---|
| 2,482,171 | 9/1949 | Gygax | 62/513 |
| 2,505,393 | 4/1950 | Garner | 62/474 |
| 2,505,934 | 5/1950 | Aughey et al. | 62/474 |
| 2,577,834 | 12/1951 | Wenk | 62/474 |
| 3,084,523 | 4/1963 | Bottum et al. | 62/509 |
| 3,545,227 | 12/1970 | Grahl | 62/474 |
| 4,111,005 | 9/1978 | Livesay | 62/503 |

*Primary Examiner*—Ronald C. Capossela
*Attorney, Agent, or Firm*—Neal J. Mosely

[57] ABSTRACT

A compression refrigeration system having means to pass the low pressure gas from the evaporator in heat exchange relationship with the high pressure liquid passing from the condenser to the expansion valve. The low pressure gas is passed in heat exchange relationship around the external casing of the receiver/drier, to maintain the receiver/drier at a lower temperature, assist in ensuring that the low pressure gas does not contain any unvaporized liquid, and to cool the high pressure liquid before passage to the expansion valve.

16 Claims, 6 Drawing Figures

LIQUID MODULATOR

Matter enclosed in heavy brackets [ ] appears in the original patent but forms no part of this reissue specification; matter printed in italics indicates the additions made by reissue.

This invention relates to improvements in and relating to automotive air conditioners.

BACKGROUND OF THE INVENTION

Conventional refrigerated automotive air conditioners operate on the high pressure system wherein a mechanical compressor compresses the refrigerant which then passes through a condenser where the heat passes from the refrigerant to the outside air to thus condense the high pressure gas into a high pressure liquid. After passing through a receiver drier, the high pressure liquid passes then through an expansion valve to thus pass low pressure liquid through the evaporator, where the low pressure liquid extracts the heat from the air passing over the evaporator to thus cool the air which is then discharged into the interior of the motor vehicle. The low pressure gas from the evaporator then passes to the compressor where it is again compressed whereby the heat which is taken up by the evaporation of the liquid into the gas in the evaporator is then discharged into the ambient air during the condensing of the high pressure gas into the high pressure liquid form.

These conventional refrigerated air conditioners have to have a high capacity in order to adequately cool the heat load of the interior of the vehicle, and often this requires that power in the order of 15 horse power is often required to effectively cool the vehicle.

A great deal of work has been carried out in order to increase the efficiencies of such refrigerated air conditioners, and it has now been found that the efficiency of the air conditioner can be effectively improved and thus the power load on the driving motor which is drawn by the compressor would be greatly reduced.

In this respect it has been found that the refrigerant after passing through the evaporator has not been completely vaporized, and the fluid issuing therefrom is a mixture of liquid and vapour. Also the high pressure liquid entering the expansion valve is often at a relatively high temperature, and if the liquid on entry to the expansion valve and also to the evaporator is of a lower temperature than a greater cooling effect to the air flowing over the evaporator would take place due to the fact that more heat has to be extracted from the air in order to vaporize the liquid.

Also with such systems the receiver/drier requires periodic maintenance, and it is common practice to replace the receiver/dryer whenever recharging has to be carried out. Also replacement of the unit must take place whenever the screens in the receiver/drier become clogged, or when the desiccant in the unit is saturated and cannot absorb any more moisture.

The efficient operation of the receiver/drier depends to a large extent upon its temperature, for the capacity of the desiccant to hold the moisture decreases as its temperature increases.

Hence if the receiver/drier is kept as cool as possible, or is cooled, then its efficiency increases.

BRIEF DESCRIPTION OF THE INVENTION

Thus there is provided according to the invention, means to cool the receiver/drier, and thus the high pressure liquid to the expansion valve, and at the same time to ensure that any liquid remaining in the low pressure gas issuing from the evaporator has been vaporized.

In its simplest form, a casing can be provided around the body of the receiver/drier, through which casing the low pressure gas from the evaporator is caused to pass, so that the receiver/drier is cooled and the heat absorbed from the receiver/drier and the high pressure liquid is used to ensure that the low pressure gas is completely vaporized with no droplets of liquid therein.

DESCRIPTION OF THE DRAWINGS

In order to more fully describe the invention reference will now be made to the accompanying drawings in which.

DESCRIPTION OF THE PREFERRED EMBODIMENT

Figure 3:
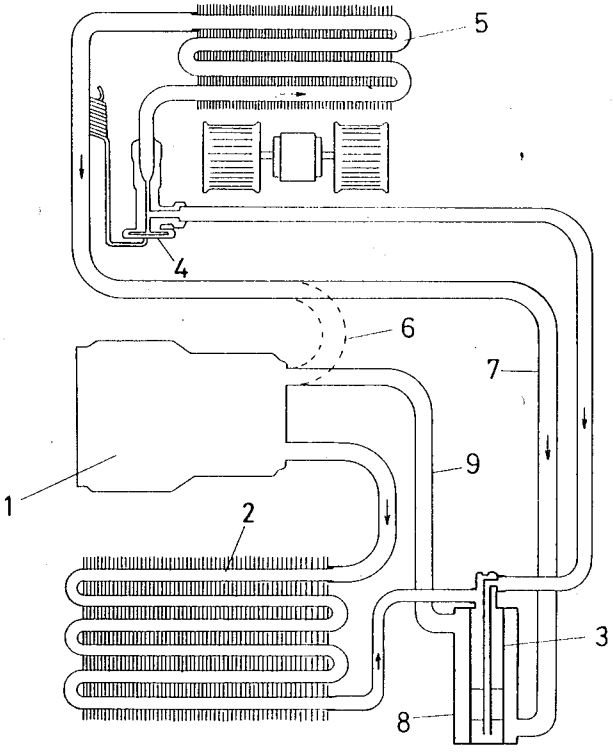
FIG. 3 is a schematic view of the receiver/drier of the invention included in an automotive air conditioning system.

Turning firstly to FIG. 3, there is shown an automotive air conditioning system including a compressor 1 which passes the high pressure gas to the condenser 2 where it is condensed into the liquid form, the high pressure liquid passing into the receiver/drier 3. The high pressure liquid then passes through the thermostatic expansion valve 4 where the proper amount of liquid refrigerant is metered into the evaporator 5 as may be required depending on the heat load. In the evaporator the low pressure liquid is evaporated into low pressure gas were it is returned to the compressor.

Conventional systems return the low pressure gas from the evaporator 5 to the compressor 1 directly as indicated by the dotted line 6.

However, in accordance with one form of the present invention, the low pressure gas from the evaporator 5 is not passed directly to the compressor 1, but is passed through passages 7 to a chamber 8 situated about the receiver/drier 3, a passage 9 leading from the chamber 8 to the inlet of the compressor 1.

It will thus be seen that there is a heat exchange relationship provided at the receiver/drier 3. At times when the heat load on the refrigeration system is greatest, that is in hot weather, that the air cooling the condenser 2 is of high temperature, often up to or even exceeding 40° C. (104° F.) that the high pressure liquid still is of a high temperature and thus contains a considerable amount of heat. This heat, if extracted, will result in a lower temperature liquid being fed to the evaporator 5, and will so enhance the cooling effect, for a greater amount of heat will have to be extracted from the air passing into the vehicle through the evaporator 5. As however, it often occurs that not all the liquid is vaporized in the evaporator 5, the excess heat in the high pressure liquid can be utilized to vaporize this low pressure liquid.

Thus in accordance with the invention this is accomplished by passing the high pressure liquid and the low pressure gas in heat exchange relationship with each other.

Figure 4:
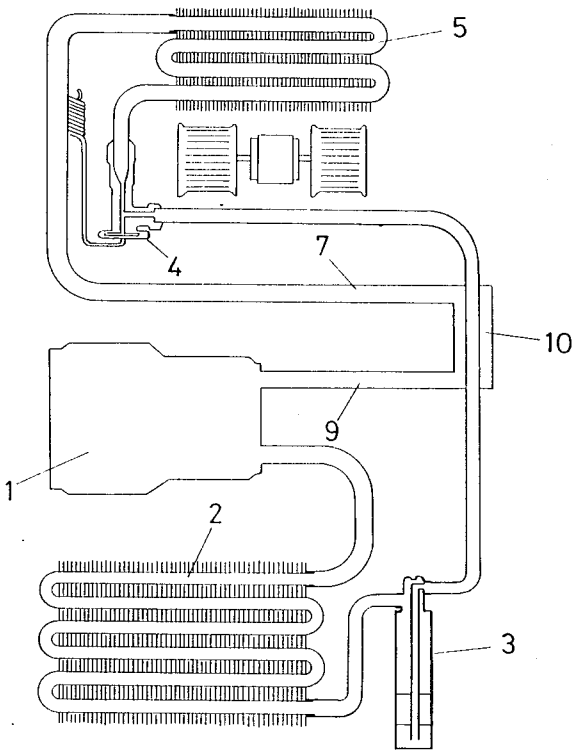
FIG. 4 is a further alternative of the invention.

In one embodiment this can be carried out in a separate heat exchanger 10 as shown in FIG. 4, where the passages 7 and 8, instead of being connected to the casing 8 about the receiver/drier 3 as shown in FIG. 3 are connected to the heat exchanger 10.

As shown in FIG. 4 the heat transfer through the heat exchanger 10 will reduce the temperature of the high pressure liquid, and also ensure that all the liquid is vaporized before entering the compressor 1.

Figure 1:
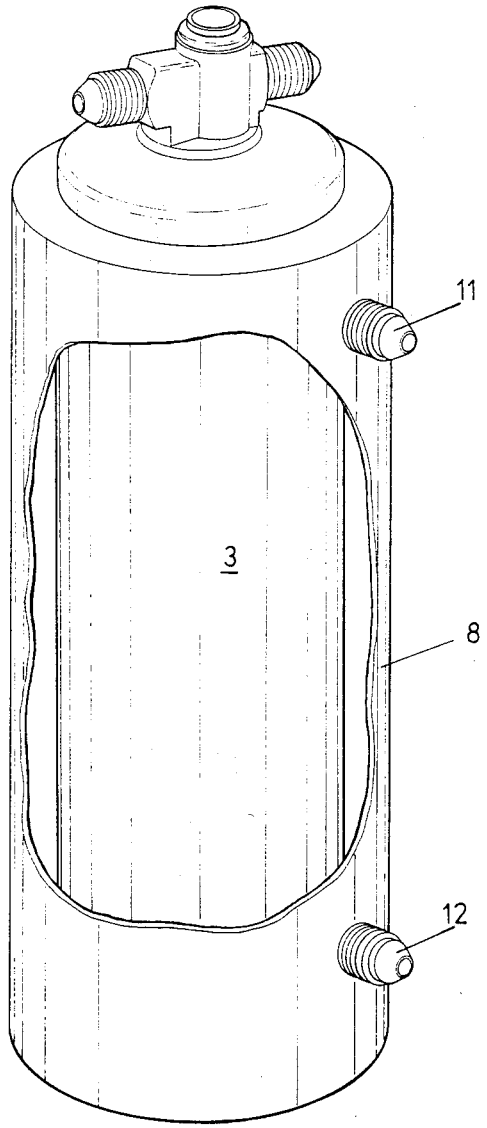
FIG. 1 is a view of a receiver/drier according to the invention, portions being cut away for clarity.
Figure 2:
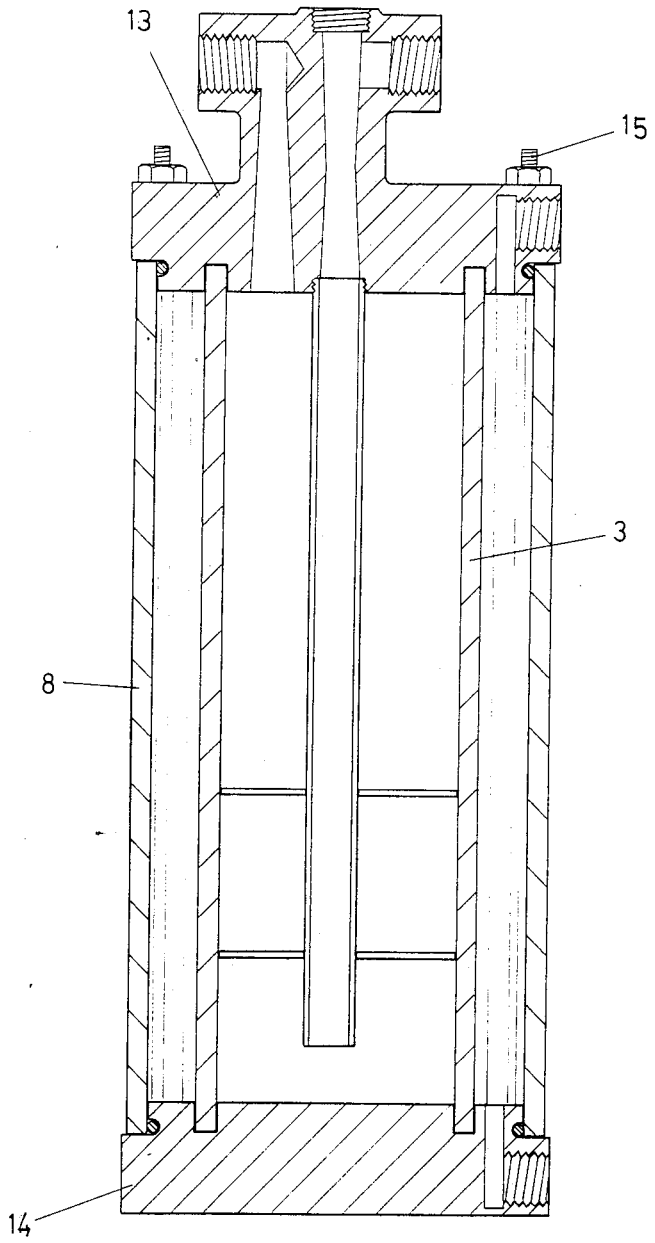
FIG. 2 is a view of an alternative embodiment.

However it is preferred to utilize the receiver/drier as a heat exchanger as shown in FIGS. 1 and 2, where the receiver/drier 3 is enclosed in a shell 8, this shell having fittings 11 and 12 for the connection to the passages 7 and 9. The receiver/drier 3 can be a standard unit, having its inlet and outlet fittings together with the sight glass for the high pressure liquid. While one form of receiver/drier 3 is shown it will be appreciated that other forms can be used, with the casing 8 being suitably modified.

As shown the casing 8 is a shell welded to the receiver/drier 3, and that the heat transfer occurs through the metal casing of the receiver/drier 3. If desired fins (not shown) can be provided in the casing 8 to assist in the heat transfer.

Reference to FIG. 2 shows an alternative form where the receiver/drier 3 is removable from the outer casing 8, so that the receiver/drier 3 can be replaced without discarding the casing 8. the casing 8 is in this embodiment a cylindrical sleeve, and is held in position by end fittings or caps 13 and 14, which seal on the casing 8 by O-rings or other sealing rings, are held in position by tie bolts 15. The cap 13 has connection fittings for the high pressure liquid to pass into the receiver/drier 3, and also a fitting for the passage of the low pressure gas down the outside of the receiver/drier casing and out an outlet in the fitting 14.

The end cap 13 has an inlet 16 for the high pressure liquid and an outlet 17 for the liquid to pass from the receiver/drier, with an outlet tube 18 extending into the receiver 3. Suitable desiccant (not shown) is provided in the receiver 3 between the screens 19.

In this way the receiver/drier 3 can be removed for servicing, or else can be serviced and recharged and be returned to the system.

Thus according to the preferred embodiment the receiver/drier 3 is utilized as the heat exchanger, and has the added advantage that the unit is easily fitted, and also the receiver/drier 3 operates at a lower temperature thus increasing its efficiency.

The casing of the receiver/drier can have fins to extend toward the outer heat exchanger casing, and the end caps can be provided with the respective unions and outlets. The usual sight glass can be fitted in the end cap in known manner or the sight glass can be provided in the line to the expansion valve.

The desiccant and strainer may thus be replaced in the unit without having to replace the whole unit. The capacity of the unit can be varied depending on the system and the length of the hoses utilized.

The unit thus in essence comprises two chambers, one for the liquid refrigerant passing through the filter and desiccant, and the other chamber containing the suction gas is in heat exchange relationships therewith.

Figure 5:
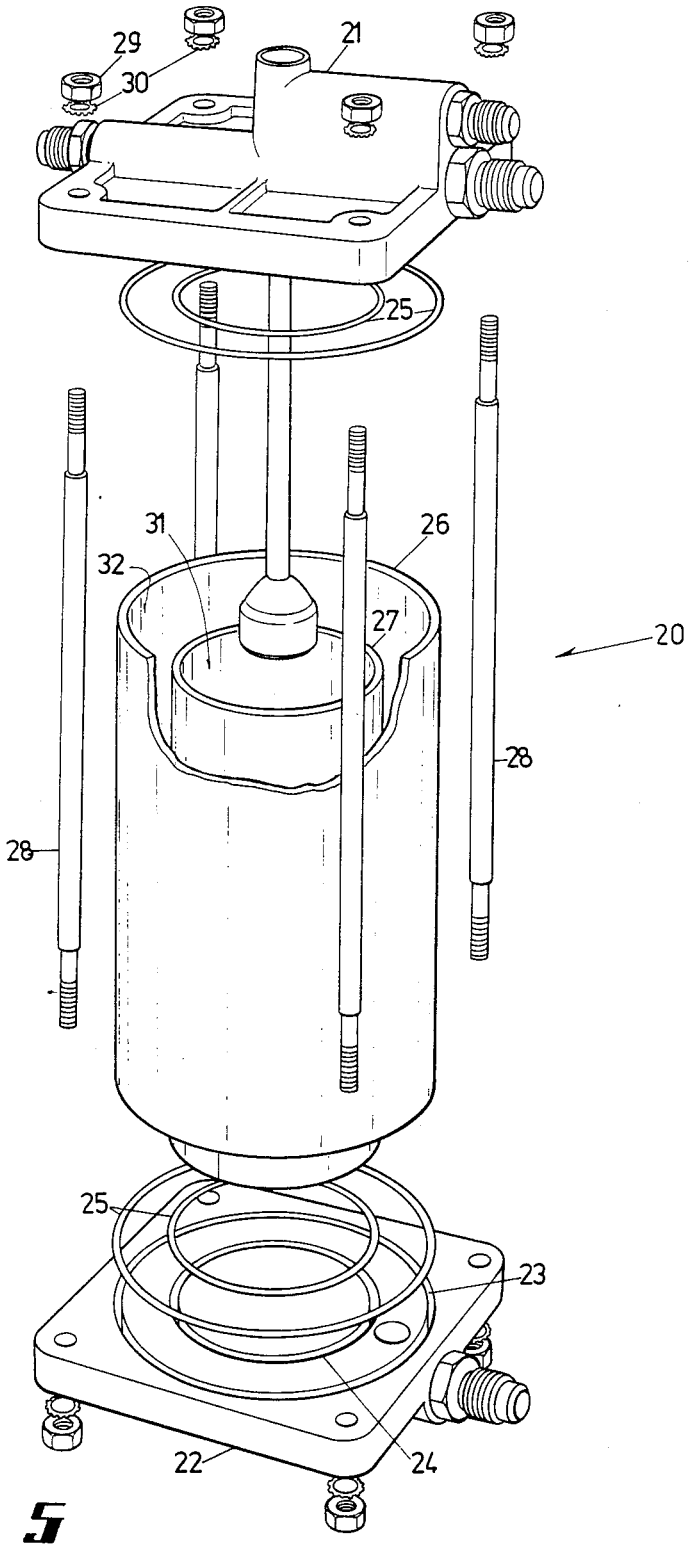
FIG. 5 is an exploded view of an alternative form of the invention.
Figure 6:
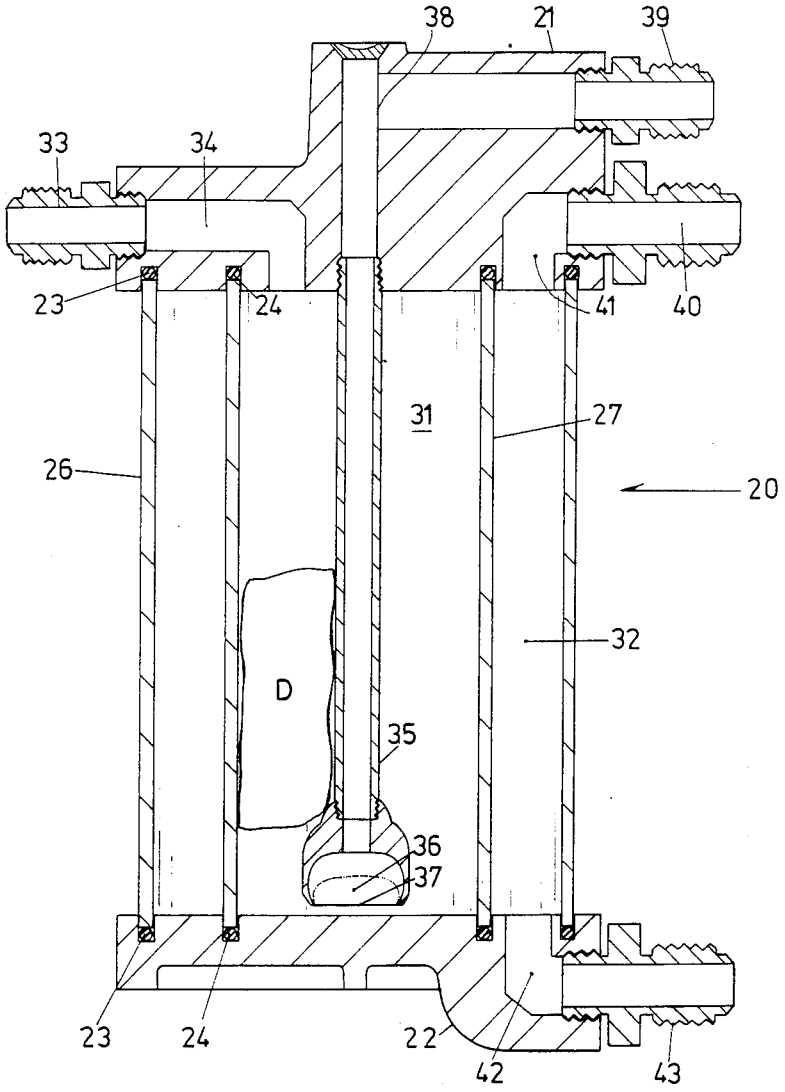
FIG. 6 is a cross-section thereof.

A further alternative of the invention is shown in FIGS. 5 and 6.

The liquid modulator 20 is formed as a dismantable unit having end caps 21, 22 each provided with a pair of concentric grooves 23, 24 having sealing rings 25. Cylinders 26, 27 are inserted into the grooves 23, 24 and connecting bolts 28 connect the end caps 21, 22 to bolt the component parts together with nuts 29 and washers 30.

There is thus formed a receiver/drier chamber 31 within the cylinder 26 and heat exchange chamber 32 within cylinder 27 about the cylinder 26.

End cap 21 is formed with an inlet nipple 33 for passage 34 opening into the receiver/drier chamber 31 to receive the high pressure liquid from the compressor.

The outlet from the chamber 31 is by an outlet tube 35 having an enlarged opening 36 and screen 37 extending downwardly toward the bottom of chamber 31 adjacent end cap 22. The tube 35 is connected to outlet tube 38 and nipple 39 in end cap 21 to deliver the high pressure liquid to the expansion valve of the refrigeration system.

A bag D of desiccant is placed in the chamber 31 to absorb moisture in the system, which bag can readily be replaced as desired. The enlarged inlet to the tube situated adjacent end cap 22 prevents the bag of desiccant from blocking the inlet to the tube 35.

End cap 21 also is provided with nipple 40 leading to the inlet passage 41 opening into chamber 32 for the low pressure gas from the evaporator to flow in heat exchange relationship with cylinder 27 and exit through outlet passage 42 and nipple 43 in end cap 22.

The liquid modulator unit is thus easily dismantable to allow the desiccant material to be replaced as desired, it being merely necessary to remove the nuts 29 one end cap, and remove and replace the desiccant material and then replace the end cap.

Hence there is provided a liquid modulator which is a combined heat exchanger and receiver/drier, the unit thus being easily substituted into conventional systems.

I claim:

1. A receiver/drier for a compression refrigeration system having a compressor, evaporator, condenser and expansion valve, said receiver/drier having a hollow body, end caps closing said hollow body, one of said end caps having an inlet and outlet for passage of high pressure liquid therethrough from the condenser to the expansion valve, said outlet having an outlet tube extending through said body to terminate at an end adjacent the other of said end cap, said end of said tube being expanded to form an inlet covered by a screen, a bag of desiccant situated in said body adjacent said outlet tube to absorb moisture in said liquid, the opening of said enlarged end being closely spaced from said other end cap to prevent blockage by the desiccant bag, an outer casing surrounding and spaced from said body to form a fluid chamber about said body, an inlet in said one end cap to receive fluid from the evaporator to flow into said fluid chamber, an outlet in said other end cap to deliver fluid to the compressor, whereby high pressure fluid and low pressure gas are in heat exchange relationships through the body of the receiver/drier.

2. A receiver/drier as defined in claim 1, characterised in said body and casing being sealed in grooves in said end caps by clamping bolts bridging said end caps to compress said body and casing against sealing rings in said grooves.

*3. A receiver/drier for a compression refrigeration system having a compressor, evaporator, condenser and expansion valve,*

*said receiver/drier being adapted to be connected between said condenser and said expansion valve, and comprising*

*a hollow body,*

*end caps closing said hollow body,*

*the upper one of said end caps having an inlet for connection to said condenser to receive liquified refrigerant therefrom, and an outlet for connection to said expansion valve for discharge of liquified refrigerant thereto for expansion and vaporization in said evaporator,*

*the lower one of said caps comprising a bottom closure without openings,*

*an outlet tube secured in said outlet and extending through said hollow body with an open end adjacent to said lower closed end cap,*

*means supporting a dessicant material inside said hollow body in the space around said outlet tube to absorb moisture in the liquid refrigerant passing therethrough,*

*an outer casing surrounding and sealed to said hollow body in spaced relation thereto to define an annular chamber in heat exchange relation with said hollow body,*

*an inlet in a wall of said outer casing for connection to the outlet side of said evaporator to receive cold, expanded refrigerant fluid therefrom,*

*an outlet in a wall of said outer casing for connection to the inlet side of said compressor, whereby hot, high pressure refrigerant liquid and cold, refrigerant gas are conducted in heat exchange relation through said hollow body and said annular chamber, respectively.*

*4. A receiver/drier for a compression refrigeration system as defined in claim 3 in which*

*said end caps are sealed to both said body and said outer casing and form the sealed connection therebetween.*

*5. A receiver/drier for a compression refrigeration system as defined in claim 3 in which*

*said dessicant supporting means comprises a pair of screens positioned laterally in longitudinally spaced relation in said hollow body and surrounding said outlet tube, and dessicant being supported therebetween.*

*6. A receiver/drier for a compression refrigeration system as defined in claim 3 in which*

*said dessicant supporting means comprises a bag filled with dessicant and wedged between said outlet tube and the wall of said hollow body.*

*7. A receiver/drier for a compression refrigeration system as defined in claim 3 in which*

*said end caps are sealed to both said body and said outer casing and form the sealed connection therebetween, and*

*said dessicant supporting means comprises a pair of screens positioned laterally in longitudinally spaced relation in said hollow body and surrounding said outlet tube, and dessicant being supported therebetween.*

*8. A receiver/drier for a compression refrigeration system as defined in claim 3 in which*

*said end caps are sealed to both said body and said outer casing and form the sealed connection therebetween, and*

*said dessicant supporting means comprises a pair of screens positioned laterally in longitudinally spaced relation in said hollow body and surrounding said outlet tube, and dessicant being supported therebetween.*

*9. A compression refrigeration system comprising a compressor, evaporator, condenser and expansion valve, and a receiver/drier connected between said condenser and said expansion valve,*

*said receiver/drier comprising*

*a hollow body,*

*end caps closing said hollow body,*

*the upper one of said end caps having an inlet connected to said condenser to receive liquified refrigerant therefrom, and an outlet connected to said expansion valve for discharge of liquified refrigerant thereto for expansion and vaporization in said evaporator,*

*the lower one of said caps comprising a bottom end closure without openings,*

*an outlet tube secured in said outlet and extending through said hollow body with an open end adjacent to said lower closed end cap,*

*means supporting a dessicant material inside said hollow body in the space around said outlet tube to absorb moisture in the liquid refrigerant passing therethrough,*

*an outer casing surrounding and sealed to said hollow body in spaced relation thereto to define an annular chamber in heat exchange relation with said hollow body,*

*an inlet in a wall of said outer casing connected to the outlet side of said evaporator to receive cold, expanded refrigerant fluid therefrom, and*

*an outlet in a wall of said outer casing connected to the inlet side of said compressor, whereby hot, high pressure refrigerant liquid and cold, refrigerant gas are conducted in heat exchange relation through said hollow body and said annular chamber, respectively.*

*10. A compression refrigeration system including a receiver/drier as defined in claim 9 in which*

*said end caps are sealed to both said body and said outer casing and form the sealed connection therebetween.*

*11. A compression refrigeration system including a receiver/drier as defined in claim 9 in which*

*said dessicant supporting means comprises a pair of screens positioned laterally in longitudinally spaced relation in said hollow body and surrounding said outlet tube, and dessicant being supported therebetween.*

*12. A compression refrigeration system including a receiver/drier as defined in claim 9 in which*

*said dessicant supporting means comprises a bag filled with dessicant and wedged between said outlet tube and the wall of said hollow body.*

*13. A compression refrigeration system including a receiver/drier as defined in claim 9 in which*

*said end caps are sealed to both said body and said outer casing and form the sealed connection therebetween, and*

*said dessicant supporting means comprises a pair of screens positioned laterally in longitudinally spaced relation in said hollow body and surrounding said outlet tube, and dessicant being supported therebetween.*

*14. A compression refrigeration system including a receiver/drier as defined in claim 9 in which*

*said end caps are sealed to both said body and said outer casing and form the sealed connection therebetween, and*

*said dessicant supporting means comprises a pair of screens positioned laterally in longitudinally spaced relation in said hollow body and surrounding said outlet tube, and dessicant being supported therebetween.*

*15. A compression refrigeration system including a receiver/drier as defined in claim 14 in which*

*said outlet tube has said open end expanded to form an inlet covered by a screen and spaced sufficiently close*

*to said other end cap to prevent blockage by said dessicant bag.*

*16. A compression refrigeration system including a receiver/drier as defined in claim 15 in which*

*said end caps each have concentric grooves with sealing rings therein in which the ends of said body and said casing are sealed, and*

*a plurality of clamping bolts interconnecting said end caps to releasably secure the same in a compressively sealed relation against said sealing rings in said grooves.*

* * * * *